(12) United States Patent
Inoue et al.

(10) Patent No.: US 6,968,467 B2
(45) Date of Patent: Nov. 22, 2005

(54) DECENTRALIZED POWER MANAGEMENT SYSTEM FOR INTEGRATED CIRCUIT USING LOCAL POWER MANAGEMENT UNITS THAT GENERATE CONTROL SIGNALS BASED ON COMMON DATA

(75) Inventors: Akihiko Inoue, Fukuoka (JP); Masao Hamada, Fukuoka (JP); Koji Kai, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 652 days.

(21) Appl. No.: 09/983,296

(22) Filed: Oct. 23, 2001

(65) Prior Publication Data

US 2002/0053039 A1    May 2, 2002

(30) Foreign Application Priority Data

Oct. 26, 2000   (JP) .............................. 2000-326850

(51) Int. Cl.$^7$ .............................................. G06F 1/32
(52) U.S. Cl. ................................................... 713/320
(58) Field of Search .......................... 326/80; 365/226; 713/320

(56) References Cited

U.S. PATENT DOCUMENTS

| | | | |
|---|---|---|---|
| 5,546,591 A | * | 8/1996 | Wurzburg et al. .......... 713/322 |
| 5,650,939 A | | 7/1997 | Yoshida |
| 5,864,702 A | | 1/1999 | Walsh et al. |
| 5,890,004 A | | 3/1999 | Poisner |
| 5,987,614 A | * | 11/1999 | Mitchell et al. ............. 713/300 |
| 6,665,802 B1 | * | 12/2003 | Ober ............................ 713/320 |
| 6,704,877 B2 | * | 3/2004 | Cline et al. .................. 713/320 |

FOREIGN PATENT DOCUMENTS

| | | |
|---|---|---|
| JP | 6-202754 | 7/1994 |
| JP | 7-44286 | 2/1995 |
| JP | 7-105174 | 4/1995 |
| JP | 2000-102080 | 4/2000 |

* cited by examiner

*Primary Examiner*—Chun Cao
*Assistant Examiner*—Albert Wang
(74) *Attorney, Agent, or Firm*—McDermott Will & Emery LLP

(57) ABSTRACT

A power management system for an integrated circuit has a signal line, a management data generating unit connected to the signal line, and a plurality of management data using units each connected to the signal line. The management data generating unit outputs, to the signal line, power management data for managing power consumption in each of the management data using units, the power management data corresponding to the state of the management data generating unit. Each of the management data using units reads the power management data for common use from the signal line and controls power consumed by the management data using unit based on the power management data.

15 Claims, 11 Drawing Sheets

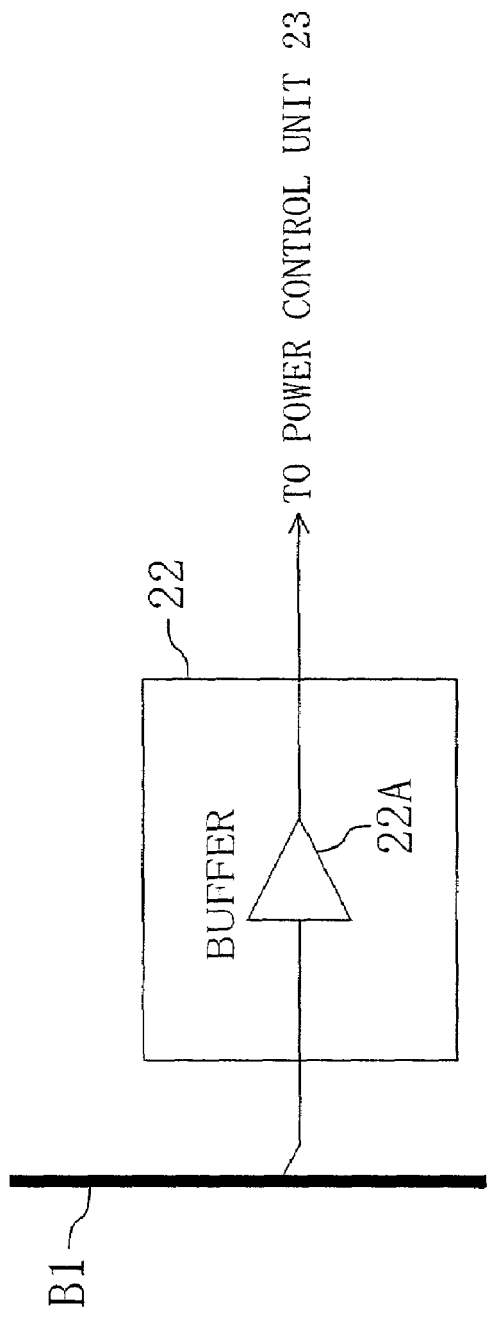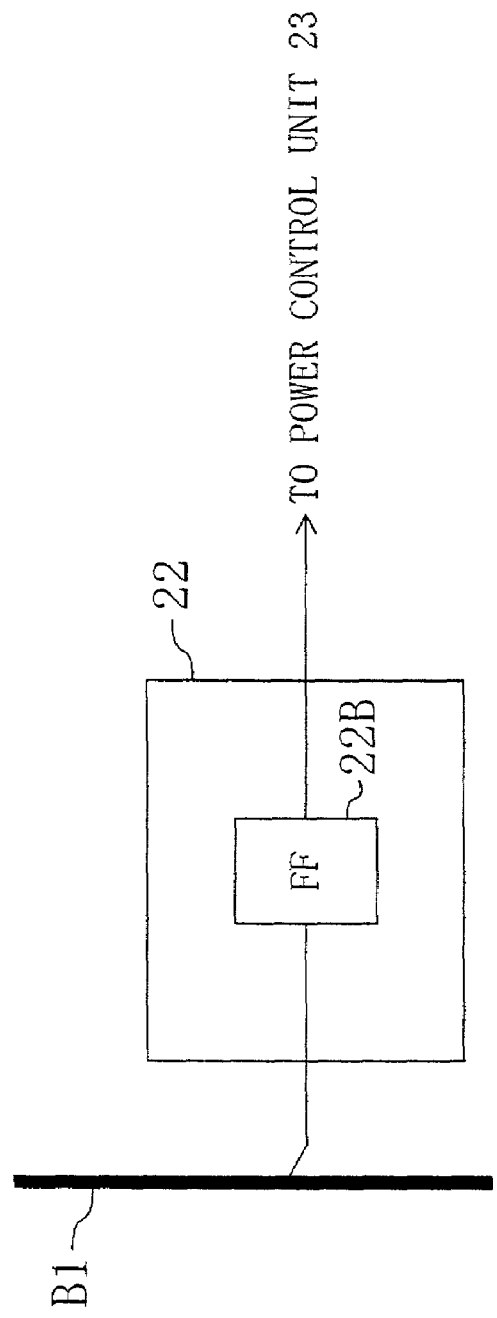
FIG. 2A
FIG. 2B

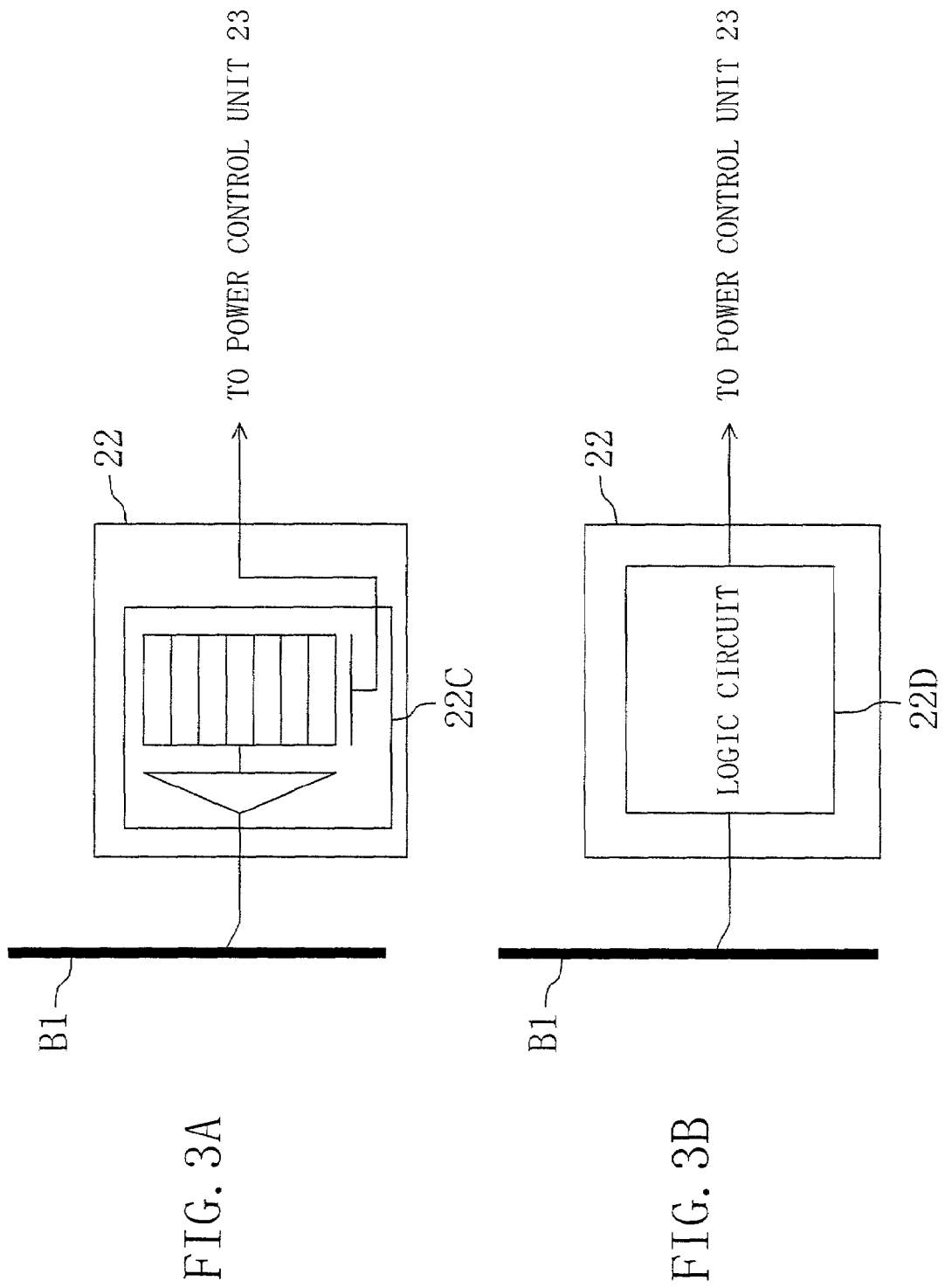

| ADDRESS | DATA |
|---------|------|
| 00 | 1 |
| 01 | 0 |
| 10 | 1 |
| 11 | 1 |

00: OPERATING STATE
01: HALTED STATE
10: HIGH-SPEED PROCESSING STATE
11: LOW-SPEED PROCESSING STATE

FIG. 10
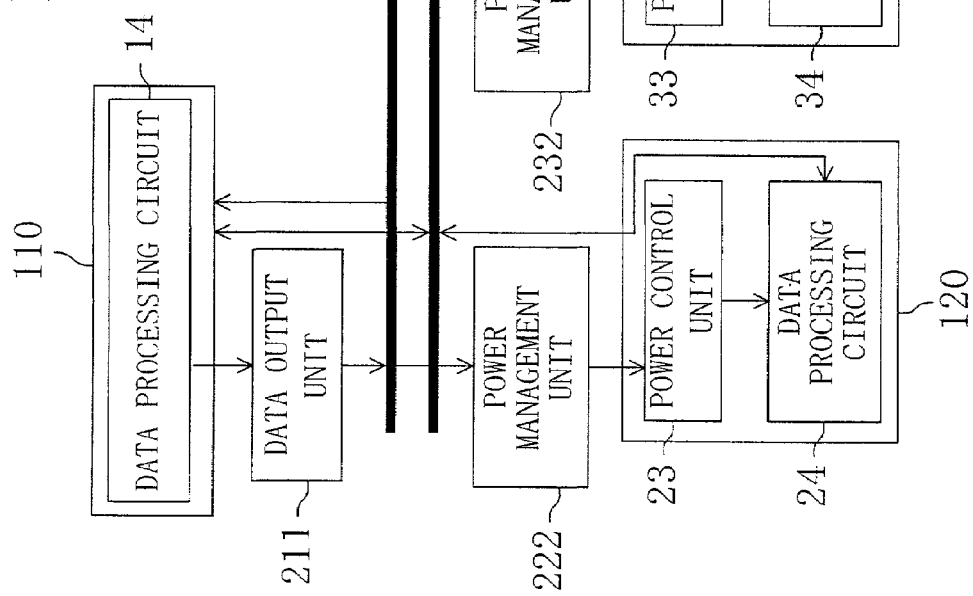
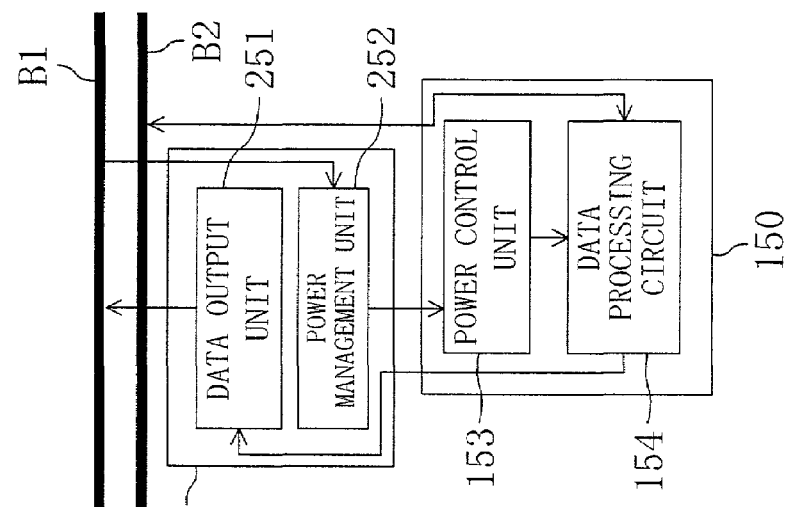

US 6,968,467 B2

DECENTRALIZED POWER MANAGEMENT SYSTEM FOR INTEGRATED CIRCUIT USING LOCAL POWER MANAGEMENT UNITS THAT GENERATE CONTROL SIGNALS BASED ON COMMON DATA

BACKGROUND OF THE INVENTION

The present invention relates to a technology for designing a lower-power integrated circuit.

Recently, power reduction in a data processing system has become an issue of great importance. In mobile equipment that has rapidly become prevalent in recent years, the lifetime of a battery may have a direct influence on the value of a product so that it is important to reduce energy consumption and increase the lifetime of the battery. In a stationary system also, the trend has been energy saving for cost reductions in the package and cooling device thereof.

Examples of currently-known power management mechanisms for achieving lower power consumption include a mechanism for cutting off a power supply or a clock supply to a circuit block which is not used and a mechanism for directing, during the standby of a system, a circuit block to use a power-supply voltage and an operating frequency each lower than during the operation of the system.

If a system is constructed by combining a plurality of blocks having such a power control mechanism, power management of the system should be performed to determine a time at which a power supply to a certain block is halted, a time at which a power-supply voltage supplied to a certain block is changed, and an amount of change in power-supply voltage.

The followings are known examples of conventional power management technologies.

Japanese Laid-Open Patent Publication No. 7-44286 discloses a power management method for a computer system, in which a power supply to each of peripheral circuits (slaves) connected to a CPU (master) is controlled by using the plurality of operating states of the system. In accordance with the method, each of the peripheral circuits is switched between a high-power operating state using a high power-supply voltage and a low-power operating state using a low power-supply voltage depending on the state of the system. As the states of the system, there are a normal operating state, a standby state, and a suspended state. Since the CPU is capable of determining the state of the system and properly switching the operating state of the peripheral circuit, power consumption can be reduced.

On the other hand, Japanese Laid-Open Patent Publication No. 2000-102080 discloses a power management system for electric devices, in which a plurality of electric devices transmit data for power management therebetween via a common network cable such that power management is performed. Each of the electric devices periodically outputs a code indicative of the On/Off state of the electric device to the network cable. The electric device predetermined to operate as the master interprets the code and effects On/Off control over the other electric devices operating as the slaves.

Thus, in each of the conventional technologies, one predetermined master gives an instruction to a power control mechanism for each of the slaves as a target for power control and controls power consumption in the slave, thereby performing power management of the entire system. In other words, the master performs centralized management of power control.

In each of the conventional power management methods, the master explicitly transmits a control signal to the power control mechanism for the slaves. Accordingly, the master should be designed in compliance with the power control mechanism for the slaves. Conversely, the slaves should also be designed in accordance with the control method of the master.

In recent design of an integrated circuit, block-based design using, e.g., IP (intellectual property), macro, VC (virtual component), or the like has been the main stream to achieve a reduced design period. If an integrated circuit system is constructed by combining a plurality of existing design blocks, however, the blocks should be re-designed such that power management is performed. This leads to the problem of a larger number of design steps.

If a certain existing design block is to be incorporated as a master into a system, to control a clock supply to a block operating as a slave, the block serving as the master should be re-designed to transmit to each of the blocks a signal for controlling the block.

SUMMARY OF THE INVENTION

It is therefore an object of the present invention to provide a power management system for an integrated circuit which allows, if block-based design of the integrated circuit is performed, easy construction of a power management mechanism for an entire integrated circuit system without redesigning blocks.

Specifically, the present invention provides a power management system for an integrated circuit, the system comprising: a signal line; a management data generating unit connected to the signal line; and a plurality of management data using units each connected to the signal line, wherein the management data generating unit outputs, to the signal line, power management data for managing power consumption in each of the management data using units, the power management data corresponding to a state of the management data generating unit, wherein each of the management data using units reads the power management data for common use from the signal line and controls power consumed by the management data using unit based on the power management data.

In the arrangement, the management data generating unit outputs, to the signal line, the power management data common to the entire integrated circuit system. Each of the management data using units connected to the signal line reads the power management data from the signal line, interprets the data, and controls power consumed thereby.

By thus using the power management data common to all the management data using units, power management is allowed to shift from centralized management performed by the management data generating unit to distributed management performed by the management data using units. This enables the management data generating unit and the management data using units to be designed independently of each other with no interdependence.

When a management data using unit is added or removed, a power management system can be constructed easily without re-designing the management data using unit and without providing an extra mechanism for power management by defining plural items of data as the power management data, designing the power management data generating unit such that it outputs such power management data, and designing the management data using units such that power management is performed by using such power management data.

In the power management system according to the present invention, the management data generating unit is preferably a master block operating as a master, the master block including: a data processing circuit for performing data processing; and a data output unit for outputting the power management data to the signal line based on a state of the data processing circuit.

This enables power management of the entire integrated circuit system in accordance with the state of the data processing circuit in the master block.

Preferably, the data processing circuit includes: a boundary scan register for storing data inputted to and outputted from the data processing circuit and outputting the data to the data output unit; and a register control unit for controlling an operation of the boundary scan register, wherein the data output unit preferably effects specified control over the resister control unit to direct the boundary scan register to store and output the data and determines the state of the data processing circuit based on the data outputted from the boundary scan register.

The arrangement makes it possible to similarly determine the internal state of even a data processing circuit of different type.

In the power management system according to the present invention, the management data generating unit preferably includes: a master block operating as a master; and a data output unit corresponding to the master block, the data output unit outputting the power management data to the signal line based on a state of the corresponding master block.

This enables power management of the entire integrated circuit system in accordance with the state of the master block. Since the data output unit independent of the master block is provided, the block which does not have the data output unit can be used as the master block of the power management system of the present invention. Even when the definition of the power management data is changed, the master block need not be re-designed and it is sufficient to re-design only the data output unit.

Preferably, the management data generating unit includes a plurality of master blocks, at least two of the plurality of master blocks corresponding in common to one of the data output units.

This enables power management based on the respective states of the plurality of master blocks. In contrast to the case where power management is performed based on the state of only one master block, the power management system can be constructed without significantly increasing the amount of hardware for power management since the number of data output units is the same.

Preferably, each of the management data using units is a slave block operating as a slave, the slave block including: a power management unit for reading the power management data from the signal line, generating a control signal for performing power control in the slave block based on the power management data, and outputting the control signal; and a power control unit for controlling power consumed by the slave block in accordance with the control signal, wherein each of the power management units generates the control signal based on the power management data for common use.

The arrangement allows the power management unit in the salve block to read and interpret the power management data and control the power of the slave block.

In the power management system according to the present invention, each of the management data using units preferably includes: a slave block operating as a slave; and a power management unit corresponding to the slave block, the power management unit reading the power management data from the signal line, generating a control signal for performing power control over the corresponding slave block based on the power management data, and outputting the control signal, wherein the slave block controls power consumed by the slave block in accordance with the control signal outputted from the corresponding power management unit, wherein each of the power management units generates the control signal based on the power management data for common use.

Since the power management unit is provided independently of the slave block, the block which does not have the power management unit can be used as the slave block of the power management system according to the present invention.

Preferably, at least two of the slave blocks correspond in common to one of the power management units.

Since the arrangement prevents the number of power management units from being increased when an additional slave block is provided, the amount of hardware for power management is barely increased.

Preferably, the power management unit comprises a buffer, the buffer regenerating a signal representing the power management data and outputting the regenerated signal.

This suppresses the influence of the degraded voltage level of the signal transmitted along the signal line.

Preferably, the power management unit comprises a flip-flop, the flip-flop latching the power management data and outputting the latched power management data.

This minimizes the influence of noise appearing on the signal line and allows stable reading of the power management data transmitted along the signal line.

Preferably, the power management unit comprises a data conversion unit for converting the power management data to the control signal.

In the arrangement, the management data generating unit can encode the state thereof and output the encoded state as the power management data, while the power management unit converts the data to the control signals used for power control. Since it is unnecessary to provide the signal lines on a per slave-block basis, the number of signal lines can be reduced and hardware cost can be reduced.

Preferably, the data conversion unit is a memory.

Since the data conversion unit is implemented by the memory, the function thereof can be changed even after the fabrication of the integrated circuit. For higher-speed operation, the data conversion unit is preferably implemented by hardware. In this case, however, the function is fixed and cannot be changed after the fabrication of the integrated circuit. If the method of encoding the power management data implemented by the management data generating unit is changed, the power management unit should therefore be re-designed. Even if the encoding method implemented by the management data generating unit is changed, however, the present invention can easily respond to the change.

Since the data conversion unit is re-writable, the encoding method implemented by the management data generating unit can be changed during the operation of the integrated circuit system and delicate power management can be performed.

Preferably, the data conversion unit is composed of a logic circuit.

This allows high-speed operation of the data conversion unit.

Preferably, the logic circuit is a programmable device.

Since the data conversion unit is implemented by the programmable device the function of which can be changed even after the fabrication thereof, the data conversion unit is re-writable even after the fabrication and the converting operation can be performed at a high speed.

Preferably, the power management system according to the present invention further comprises: a data transmission unit between the signal line and the management data using unit, the data transmission unit reading the power management data from the signal line, selecting data to be transmitted to the management data using unit, and outputting the selected data.

Since the data transmitting unit outputs only required data to the management data using units each connected to the signal line via the data transmitting unit, it is possible to group the management data using units and perform different power management on a per group basis without re-designing the management data using units.

In the power management system according to the present invention, the management data using units are preferably grouped, the management data generating unit preferably outputs group specifying data in conjunction with the power management data to the signal line, and each of the management data using units belonging to a group specified by the group specifying data preferably controls power consumed by the management data using unit.

In the arrangement, the management data generating unit specifies a management data using unit or a plurality of management data unit units that have been grouped such that power management is performed. Consequently, the target for power management can be changed easily.

The power management system according to the present invention preferably includes, in addition to the management data generating unit, at least one management data generating unit, one of the management data generating units outputting, to the signal line, the power management data corresponding to a state of the management data generating unit.

This allows one of the plurality of management data generating units to output power management data such that power management is performed. Even if normal data processing is concentrated on the management data generating unit which is outputting the power management data and the capacity thereof is nearly full, e.g., it is possible to direct another management data generating unit to output power management data and perform power management without interrupting the normal data processing other than power management.

BRIEF DESCRIPTION OF THE DRAWINGS

FIGS. 2A and 2B are block diagrams showing examples of the power management unit of FIG. 1;

FIGS. 3A and 3B are block diagrams showing other examples of the power management unit of FIG. 1;

FIG. 10 is a block diagram of a power management system for an integrated circuit according to a third embodiment of the present invention;

DETAILED DESCRIPTION OF THE INVENTION

Figure 1:
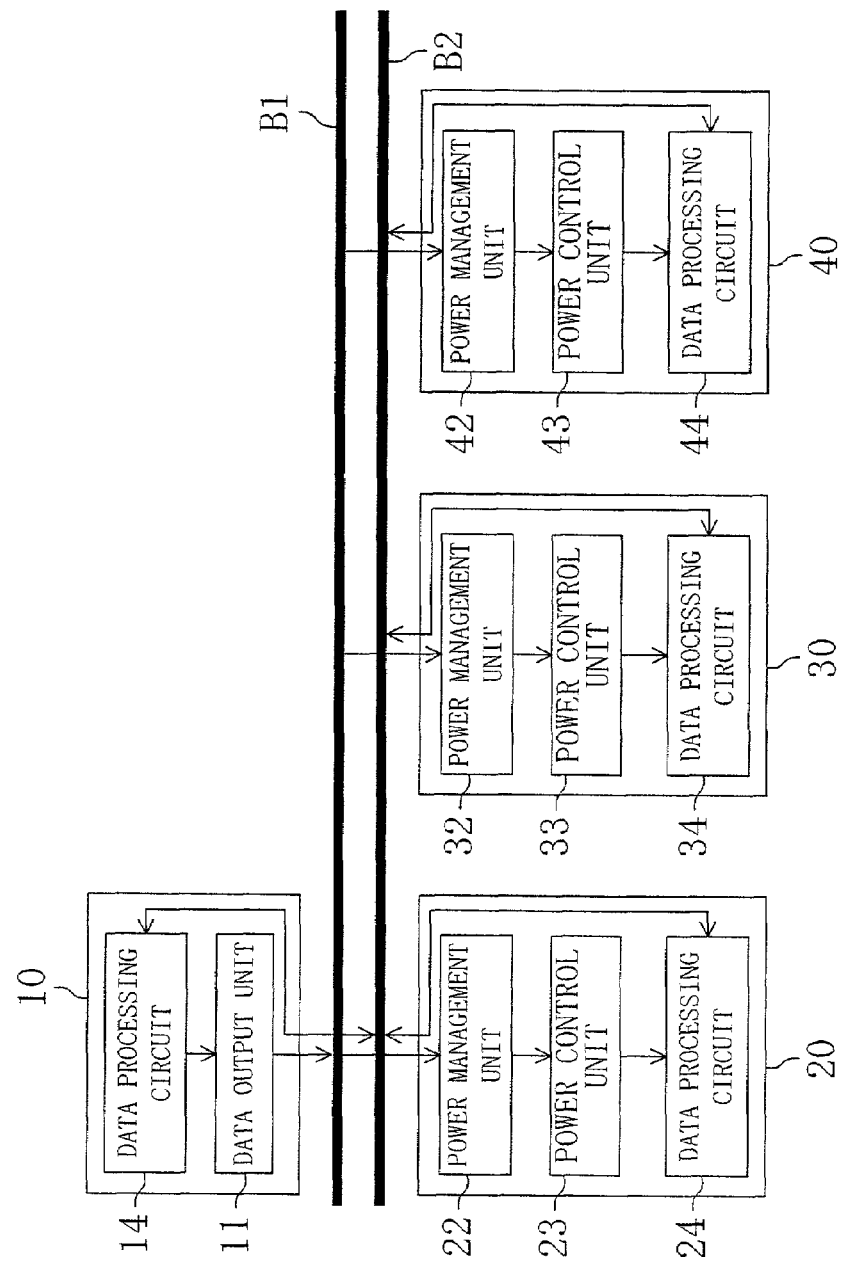
FIG. 1 is a block diagram of a power management system for an integrated circuit according to a first embodiment of the present invention.

Referring now to the drawings, the embodiments of the present invention will be described.

Embodiment 1

FIG. 1 is a block diagram of a power management system for an integrated circuit according to a first embodiment of the present invention. The power management system of FIG. 1 comprises buses B1 and B2 as signal lines and blocks 10, 20, 30, and 40. In the present embodiment, the block 10 operates as a management data generating unit and each of the blocks 20, 30, and 40 operates as a management data using unit. The present specification assumes that a bus includes a signal line connecting one block to another block only.

The block 10 comprises a data output unit 11 and a data processing circuit 14, while the block 20 comprises a power management unit 22, a power control unit 23, and a data processing circuit 24. Likewise, the block 30 comprises a power management unit 32, a power control unit 33, and a data processing circuit 34 and the block 40 comprises a power management unit 42, a power control unit 43, and a data processing circuit 44.

The bus B1 is connected to the data output unit 11 and to the power management units 22, 32, and 42. The bus B1 transmits power management data. The bus B2 is connected to the data processing circuits 14, 24, 34, and 44. The bus B2 transmits data other than the power management data and required for data processing in each of the blocks.

The data processing circuit 14 is, e.g., a CPU (central processing unit), an input/output processing circuit (I/O circuit), or the like. Each of the data processing circuits 24, 34, and 44 is a circuit having, e.g., a data processing function, a control function, a function as a memory, or the like.

A description will be given to the operation of the power management system of FIG. 1. In the power management system, each of the blocks 20, 30, and 40 performs power management of its own in accordance with the power management data outputted from the block 10. That is, the block 10 operates as a master, while the blocks 20, 30, and 40 operate as slaves.

The data processing circuit 14 outputs data indicative of the internal state thereof to the data output unit 11. The data output unit 11 generates power management data based on the data outputted from the data processing circuit 14 and constantly outputs the power management data to the bus B1. The power management units 22, 32, and 42 periodically read the power management data on the bus B1, determine how to perform power control of the blocks to which they belong based on the data, and output control signals to the respective power control units 23, 33, and 43. Similarly, the management units 22, 32, and 42 also read the power management data and output the control signals upon receipt of instructions to output the control signals from the data processing circuits 14, 24, 34, and 44. The power control units 23, 33, and 43 perform power control of the respective blocks 20, 30, and 40 in accordance with the control signals inputted thereto.

If the data processing circuit 14 is a CPU, an OS (operating system) or application software operating on the CPU and a register (not shown) operate as the data output unit 11. Specifically, the OS or the like monitors the state of the CPU and writes power management data based on the state of the CPU in the register. The register outputs the power management data to the bus B1.

Since the power management system of FIG. 1 transmits the power management data by using the bus B1, power management suitable for the current state of the system can be performed on each of the blocks. The power management data outputted from the master block (block 10) is shared by all the slave blocks (the blocks 20, 30, and 40) by using the bus B1.

Although the present embodiment gives a description related to the slave blocks only to the block 20, the same shall apply to the blocks 30 and 40. It is to be noted that the number of the slave blocks is not limited.

Thus, in the power management system of FIG. 1, the right to control power is distributed among the slave blocks so that the power management unit in each of the slave blocks makes a judgment based on the power management data. Accordingly, each of the slave blocks can manage the power of its own. To allow this, it is appropriate to preliminarily define power management data and design the master block and the slave blocks such that the master block outputs the power management data and the slave blocks perform power management by using the power management data. Since it is unnecessary to provide an additional mechanism for power management, if a block is added or removed, a power management mechanism can be constructed easily without re-designing the block.

A detailed description will be given to the power management data. As the power management data, either of the following two types can be adopted.

(1) Data that can be used as the control signals to the power control units of the slave blocks (2) Data that cannot be used as the control signals to the power control units of the slave blocks As an example of the power management data of (1), there is an input signal to a power control mechanism disclosed in Japanese Laid-Open Patent Publication No. 7-105174. The power control mechanism allows a clock to be supplied selectively to a plurality of blocks mounted in a chip based on power management data given as the input signal from the outside of the chip.

In the case of (1), the data output unit 11 of FIG. 1 generates data which allows direct control of each of the power control units based on the data outputted from the data processing circuit 14 and outputs the generated data as power management data to the bus B1. The bus B1 is assumed to be a bundle of control lines to the individual slave blocks. The power management unit 22 outputs the data read from the bus B1 without converting it to the power control unit 23. It is also possible for the power control unit 23 to read the power management data from the bus B1 without providing the power management unit 22.

As an example of the power management data of (2), there is data obtained by encoding the state of an integrated circuit system (hereinafter referred to as the system state). As examples of the system state, there can be defined, e.g., a high-speed processing state, a low-speed processing state, and the like. In the case of (2), data indicative of one of the defined system states is sent along the bus so that the bit width of the bus is reduced compared with the case of (1). This reduces the power consumption and cost of the bus.

In the case of (2), the data output unit 11 of FIG. 1 determines the system state based on the data outputted from the data processing circuit 14 and outputs power management data in accordance with the system state to the bus B1. The power management unit 22 converts the data read from the bus B1 based on a predetermined correspondence and outputs data resulting from the conversion as the control signal to the power control unit 23.

As the system state, an arbitrary state can be defined. In encoding the system state, a typical coding method such as Huffman coding or one-hot coding can also be used. Alternatively, a coding method which reduces the number of switchings of the bus, such as Gray-code coding may also be used.

FIGS. 2A and 2B are block diagrams showing examples of the power management unit 22 of FIG. 1. A description will be given herein below to the case where the power management data can be used directly as the control signal to the power control unit 23 of the slave block 20, i.e., the case where the power management unit 22 outputs the power management data without converting it.

The power management unit 22 of FIG. 2A has a buffer 22A. The buffer 22A has an input terminal connected to the predetermined one of signal lines in the bus B1. A signal is constantly inputted from the bus B1 to the buffer 22A. The buffer 22A regenerates the inputted signal and outputs the regenerated signal to the power control unit 23. This suppresses the degradation of the voltage level of the signal transmitted along the bus B1.

The power management unit 22 may also comprise a plurality of buffers 22A such that signals on the plurality of signal lines in the bus B1 are outputted to the power control unit 23. The plurality of buffers 22A may also be connected in series. It is also possible to provide direct connections between the signal lines in the bus B1 and the power control unit 23 without intervention of the buffer 22A or the like.

The power management unit 22 of FIG. 2B has a flip-flop 22B. The flip-flop 22B has an input terminal connected to the predetermined one of the signal lines in the bus B1. A signal is constantly inputted from the bus B1 to the flip-flop 22B and the flip-flop 22B latches the signal with proper timing. The timing may be controlled from the outside or inside of the block 20 of FIG. 1. The flip-flop 22B immediately outputs the latched signal to the power control unit 23. This allows the flip-flop 22B to minimize the influence of noise appearing on the bus B1 and stably read the signal transmitted along the bus B1.

The power management unit 22 may also comprise the plurality of flip-flops 22B such that the signals on the plurality of signal lines in the bus B1 are outputted to the power control unit 23.

FIGS. 3A and 3B are block diagrams showing other examples of the power management unit 22 of FIG. 1. A description will be given herein below to the case where the power management data cannot be used directly as the control signal to the power control unit 23 of the slave block 20, i.e., the case where the power management unit 22 converts the power management data and outputs data resulting from the conversion.

The power management unit 22 of FIG. 3A has a memory 22C as a data conversion unit. The memory 22C has an input terminal connected to the bus B1. The memory 22C stores data to be outputted to the power control unit 23, which corresponds to the inputted power management data. The memory 22C uses data inputted from the bus B1 as an address and outputs data corresponding to the address to the power control unit 23. Even if the master block changes the method of encoding the power management data, therefore, it is sufficient to change the data stored in the memory 22C and the slave blocks need not be re-designed.

Figures 4, 5:
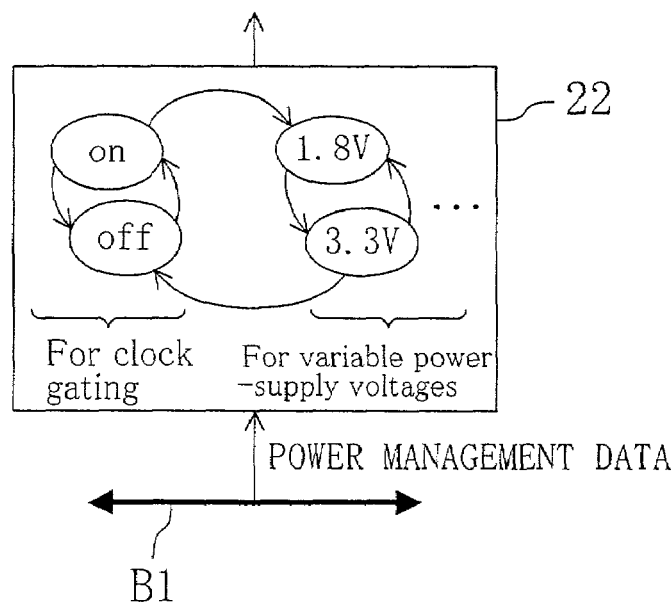
FIG. 4 illustrates an example of data stored in the memory of FIG. 3A.
FIG. 5 shows an example of a state transition diagram of the power management unit.

FIG. 4 illustrates an example of the data stored in the memory. It is assumed that the system state represented by the power management data includes the four states of an operating state, a halted state, a high-speed processing state, and a low-speed processing state. The values "00", "01", "10", and "11" correspond as the power management data to the respective states. The system state is any one of the four states.

It is assumed that the power control unit 23 halts a clock supply to the data processing circuit 24 if "0" is inputted thereto and provides a clock supply to the data processing circuit 24 if "1" is inputted thereto.

If data on the bus B1 is assumed to be "10" (indicative of the high-speed processing state), the memory 22C outputs "1", which is the data at the address "10", to the power control unit 23. In this case, the power control unit 23 provides a clock supply to the data processing circuit 24. If the data on the bus B1 is "01" (indicative of the halted state), the memory 22C outputs "0", which is the data at the address "01", to the power control unit 23. In this case, the power control unit 23 halts the clock supply to the data processing circuit 24.

By re-writing the data stored in the memory 22C, it is also possible to perform delicate power management by, e.g., dynamically changing the method of encoding the power management data in the master block during the operation of the system. Instead of the memory 22C, a register and a decoder may also be used.

If the bit width of an address in the memory 22C is larger than the bit width of the bus B1, a power-supply voltage or a ground voltage may be given appropriately to the bits of some of address inputs such that a logic value is fixed.

The power management unit 22 of FIG. 3B has a logic circuit 22D as a data conversion unit. The logic circuit 22D has an input terminal connected to the bus B1. The logic circuit 22D has a programmable device. The programmable device is a device the function of which can be changed after the fabrication thereof, such as a FPGA (field programmable gate array) or a PLD (programmable logic device). The logic circuit 22D has preliminarily been programmed with the relationship between the power management data inputted thereto and data to be outputted to the power control unit 23.

The logic circuit 22D outputs data corresponding to the data inputted thereto from the bus B1 to the power control unit 23. Even if the master block changes the method of encoding the power management data, therefore, it is sufficient to change the configuration of the programmable device and the slave blocks need not be re-designed. The use of the logic circuit 22D allows much faster data conversion than achieved with the use of the memory.

The function of the programmable device may be changed from the outside or inside of the block 20 by directing the programmable device to read configuration data. As the logic circuit 22D, a gate array or like device may also be used.

A description will be given to still another example of the power management unit 22. FIG. 5 shows an example of a state transition diagram of the power management unit 22. The power management unit 22 has a state machine which includes four states, as shown in FIG. 5. It is assumed here that there are two states ("on", "off") related to clock gating and two states ("1.8 V", "3.3 V") related to control over variable power-supply voltages. The state of the power management unit 22 shifts depending on the current state and on the power management data inputted from the bus B1. The power management unit 22 outputs a control signal in accordance with the state thereof to the power control unit 23. Such a power management unit 22 can be implemented easily by using a logic circuit having a sequential circuit, though it is not depicted.

If the state of the power management unit 22 is "off", e.g., the power management unit 22 outputs, to the power control unit 23, a signal for cutting off the clock supply to the data processing circuit 24 of the block to which it belongs. If the state of the power management unit 22 is "1.8 V", the power management unit 22 outputs, to the power control unit 23, a signal for adjusting a voltage supplied to the block to which it belongs to 1.8 V.

The power control unit 23 controls a clock supply and a supplied voltage within the block to which it belongs in accordance with the inputted control signal, thereby controlling power consumed by the block.

A description will be given to the case of controlling, e.g., a clock supply. It is assumed that the power control unit 23 comprises a decoder (not shown) and the data processing circuit 24 has a plurality of internal circuits. The decoder decodes the control signal inputted to the power control unit 23 and outputs a clock enable signal only to that one of the internal circuits of the data processing circuit 24 which is specified by the control signal. A clock is supplied to the circuit that has received the clock enable signal. If a control signal which directs the decoder not to output the clock enable signal is given to the decoder, the clock within the data processing circuit 24 is halted completely.

Although the present embodiment has described the power management system using the bus B1 for transmitting the power management data, it is also possible to transmit the power management data by using the bus B2 for data processing without providing the bus B1. In that case, the bus B2 for data processing is used appropriately by time division, e.g., the data output unit 11 is scheduled appropriately to send the power management data to the bus B2 at specified time intervals.

It is also possible to provide a mechanism which allows a distinction between the power management data and other normal data and transmit the power management data by using the bus B2. If one of the signal lines in the bus is designated as an enable signal line and the data on the bus is determined to be normal data when the data on the enable signal line is "1" and to be the power management data when the data on the enable signal line is "0", e.g., each of the power management units can distinguish the power management data from the other normal data. Thus, the conventional bus B2 for data transmission and the bus B1 for transmitting the power management data can be embodied physically in a single bus so that the amount of hardware is reduced.

It is to be noted that a method for transmitting the power management data is not limited so long as the power management data can be broadcast to a plurality of blocks. Although the present embodiment has described the case where the bus connected to the plurality of slave blocks is used for the transmission of the power management data, wires providing direct connections between the master block and the slave blocks may also be provided instead. In this case also, the power management data is used in common by the slave blocks, the slave block controls the power of its own, and a power control mechanism can easily be constructed without redesigning the block.

Variation 1 of Embodiment 1

Although all the slave blocks connected to the bus B1 have effected power control by sharing the same power management data in the first embodiment, it is also possible to use only some of the slave blocks as targets for power control. To achieve this, the following two methods can be implemented.

(a) Data is sorted out on the slave side.
(b) A group ID is issued from the master.

Figure 6:
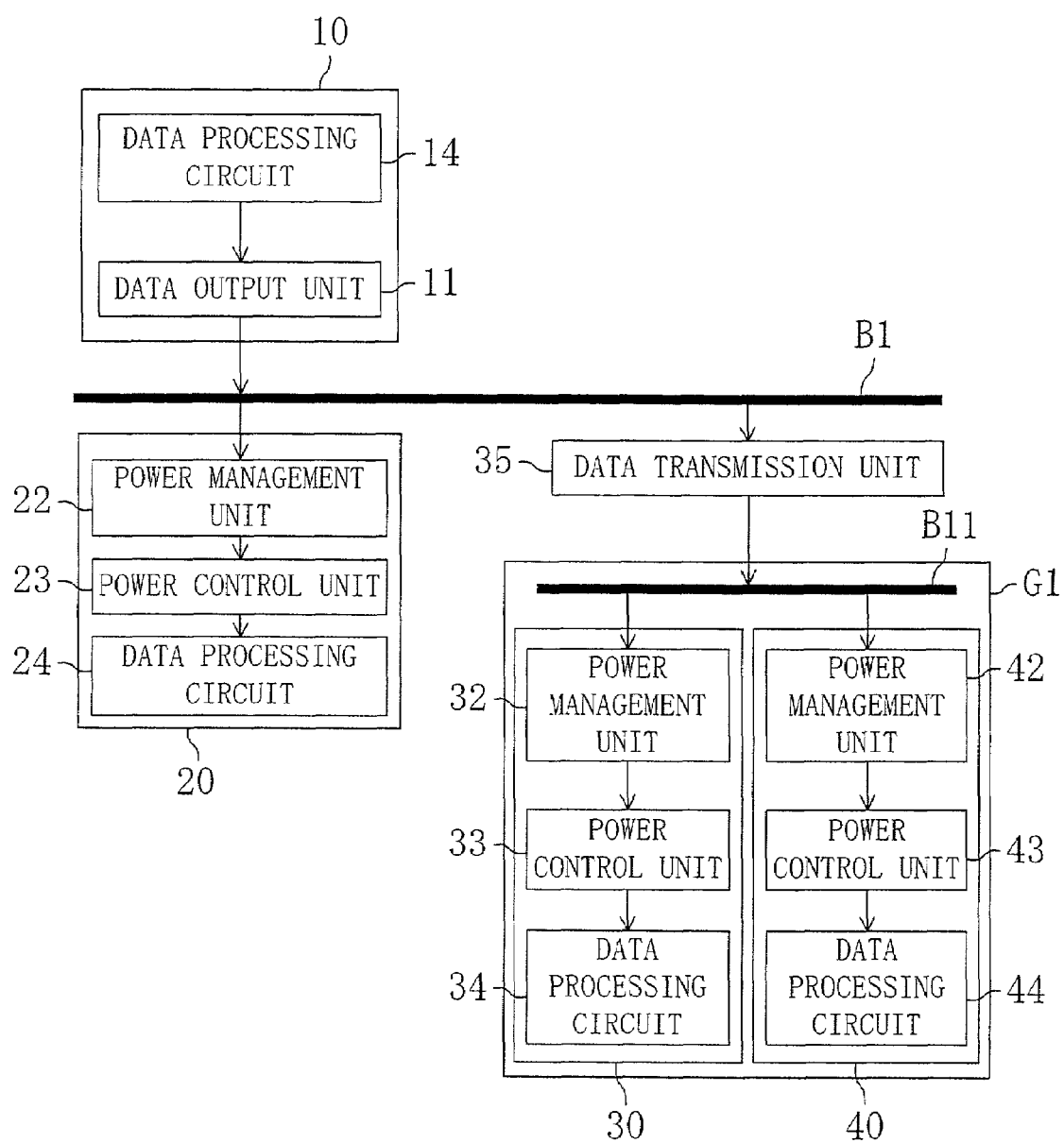
FIG. 6 is a block diagram of a power management system for an integrated circuit, which comprises a data transmission unit.

A description will be given to the case where data is sorted out on the slave side. FIG. 6 is a block diagram of a power management system for an integrated circuit comprising a data transmitting unit 35. The power management system of FIG. 6 comprises the data transmitting unit 35 and a bus B11 in addition to the power management system of FIG. 1. In FIG. 6, the block 10 operates as a management data generating unit and each of the blocks 20, 30, and 40 operates as one management data using unit.

The blocks 30 and 40 are connected to the bus B11, not to the bus B1, to form a group G1. The data transmitting unit 35 reads power management data from the bus B1, selects data to be transmitted to the blocks belonging to the group G1 from the power management data that has been read, and outputs the selected data to the bus B11.

This allows the blocks to be grouped and independent power management to be performed on a per group basis without re-designing the power management units. The data transmitting unit 35 may also convert the power management data inputted thereto to data suitable for the blocks belonging to the group G1 and output the data.

A description will be given next to the operation of the power management system when the group ID is issued from the master with reference to FIG. 1. The data output unit 11 of the block 10 outputs the power management data and group specifying data to the bus B1. The power management data and the group specifying data may be outputted simultaneously or in succession. The power management units 22, 32, and 42 of the blocks 20, 30, and 40 initially decode the group specifying data. When the power management units 22, 32, and 42 belong to the group obtained as a result of the decoding, they transmit the power management data to the power control units 23, 33, and 43 of the blocks. Consequently, power control can be performed by specifying a particular group from the master block.

Variation 2 of Embodiment 1

The present variation will describe the case where a data processing circuit is compliant with the IEEE (institute of electrical and electronics engineers) standard 1149.1. Hereinafter, the IEEE standard 1149.1 will be referred to simply as a JTAG (joint test action group) standard.

Figure 7:
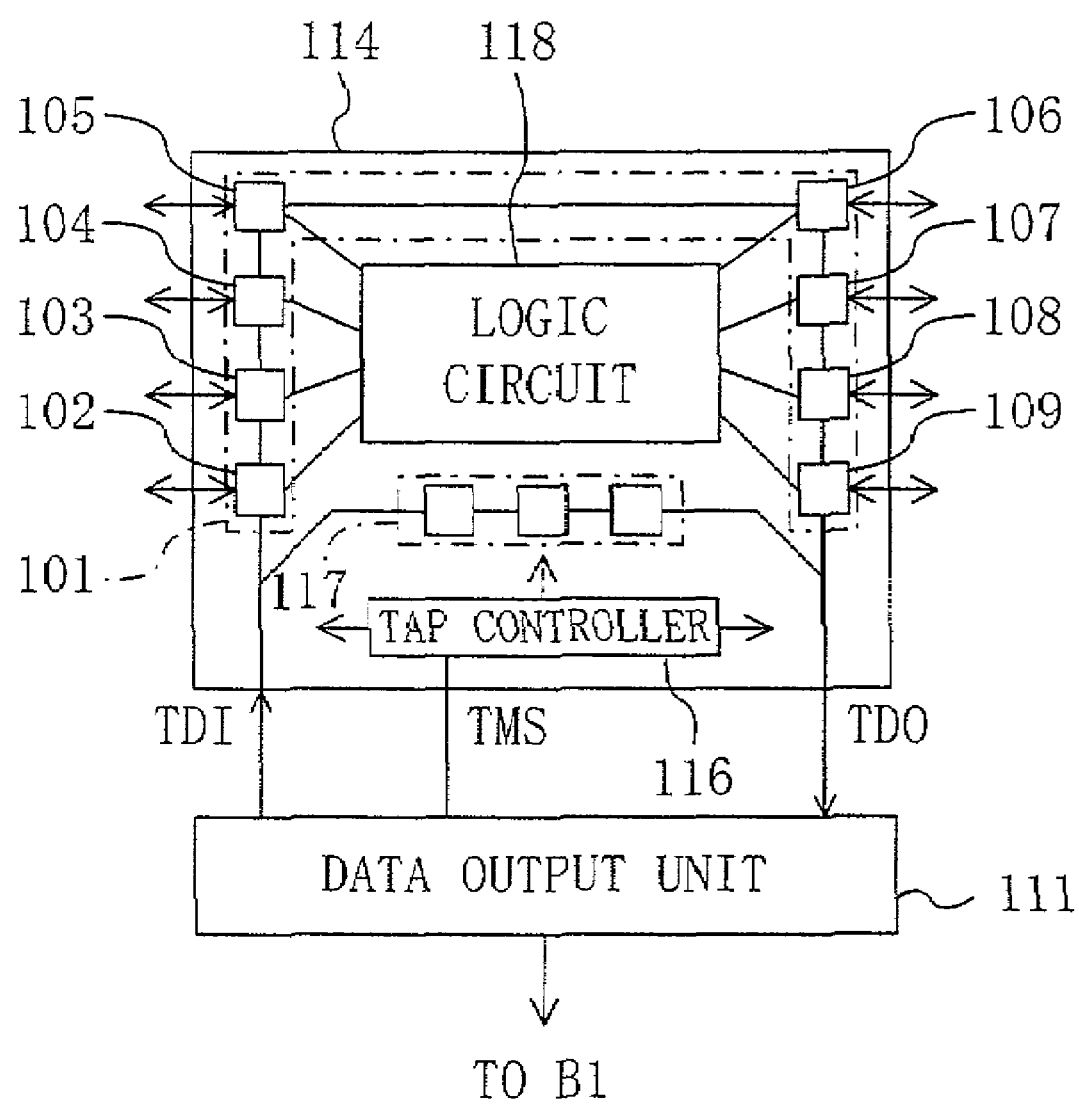
FIG. 7 is a block diagram showing an example of a data processing circuit compliant with the JTAG (joint test action group) standard.

FIG. 7 is a block diagram showing an example of a data processing circuit 114 compliant with the JTAG standard. The data processing circuit 114 comprises: a boundary-scan register 101; a TAP (test access port) controller 116 as a register control unit; an instruction register 117; and a logic circuit 118. The boundary-scan register 101 comprises boundary-scan cells 102, 103, 104, 105, 106, 107, 108, and 109. Besides, the data processing circuit 144 comprises a bypass register. These registers and the TAP controller 116 constitute a test logic circuit compliant with the JTAG standard. The boundary-scan register 101 and the bypass register are data registers.

The data output unit 111 outputs data to the boundary-scan cell 102 or to the instruction register 117 through the TDI (test data input) port of the data processing circuit 114. The data output unit 111 reads data from the boundary scan cell 109 or from the instruction register 117 through the TDO (test data output) port of the data processing circuit 114. The data output unit 111 controls the state of the TAP controller 116 by controlling a value given to a TMS (test mode select) port in compliance with the IEEE standard 1149.1.

The TAP controller 116 can assume sixteen states and controls the boundary scan register 101, the instruction register 117, or the bypass register in accordance with the state thereof. Between the pins through which the data processing circuit 114 inputs and/or outputs data and the logic circuit 118, the boundary scan cells 102 to 109 corresponding to the respective pins are connected. The logic circuit 118 inputs and outputs data between itself and the outside of the data processing circuit 114 via the boundary scan cells 102 to 109. The boundary scan register 101 operates as a shift register which sequentially shifts data stored therein and outputs the data to the data output unit 111. For detailed information on the JTAG standard, see the IEEE Std 1149.1-1990.

A description will be given to the case where the data processing circuit 114 operates in a normal mode, not in a test mode. The data output unit 111 sets a SAMPLE instruction to the instruction register 117 via the TDI port of the data processing circuit 114. At this time, the TAP controller 116 controls the operation of the boundary scan register 101 based on the state thereof.

The data output unit 111 causes the TAP controller 116 to shift to a state such that the data registers capture data. The TAP controller 116 controls the boundary scan register 101 such that data inputted to and outputted from the data processing circuit 114, i.e., data passing through each of the pins of the data processing circuit 114 is stored. Since the boundary scan register 101 does not affect the operation of the logic circuit 118, the data processing circuit 114 operates in the normal mode.

Thereafter, the data output unit 111 causes the TAP controller 116 to shift to a state such that the data registers shift data. The TAP controller 116 causes the boundary scan register 101 to shift data stored therein and the boundary scan register 101 sequentially outputs the data to the data output unit 111 via the TDO port.

The data output unit 111 determines the state of the data processing circuit 114 based on the data outputted from the boundary scan register 101, obtains power management data based on the state of the data processing circuit 114, and outputs the power management data to the bus B1. Specifically, for example, the data output unit 111 extracts a bit sequence representing the state of the data processing circuit 114 from the data received from the boundary scan register 101 and outputs the extracted bit sequence as the power management data to the bus B1.

By thus using the data processing circuit compliant with the JTAG standard, even if a data processing circuit of different type is incorporated into the integrated circuit, it becomes possible to similarly read the internal state of the data processing circuit. This allows the use of the same data output unit even if a data processing circuit of different type is incorporated into the integrated circuit and reduces a design burden for power management.

Instead of causing the boundary scan register to shift data, if the data output unit is so configured as to acquire the data stored in the individual boundary scan cells in parallel, the state of the data processing circuit can be transmitted faster to the bus.

Embodiment 2

Figure 8:
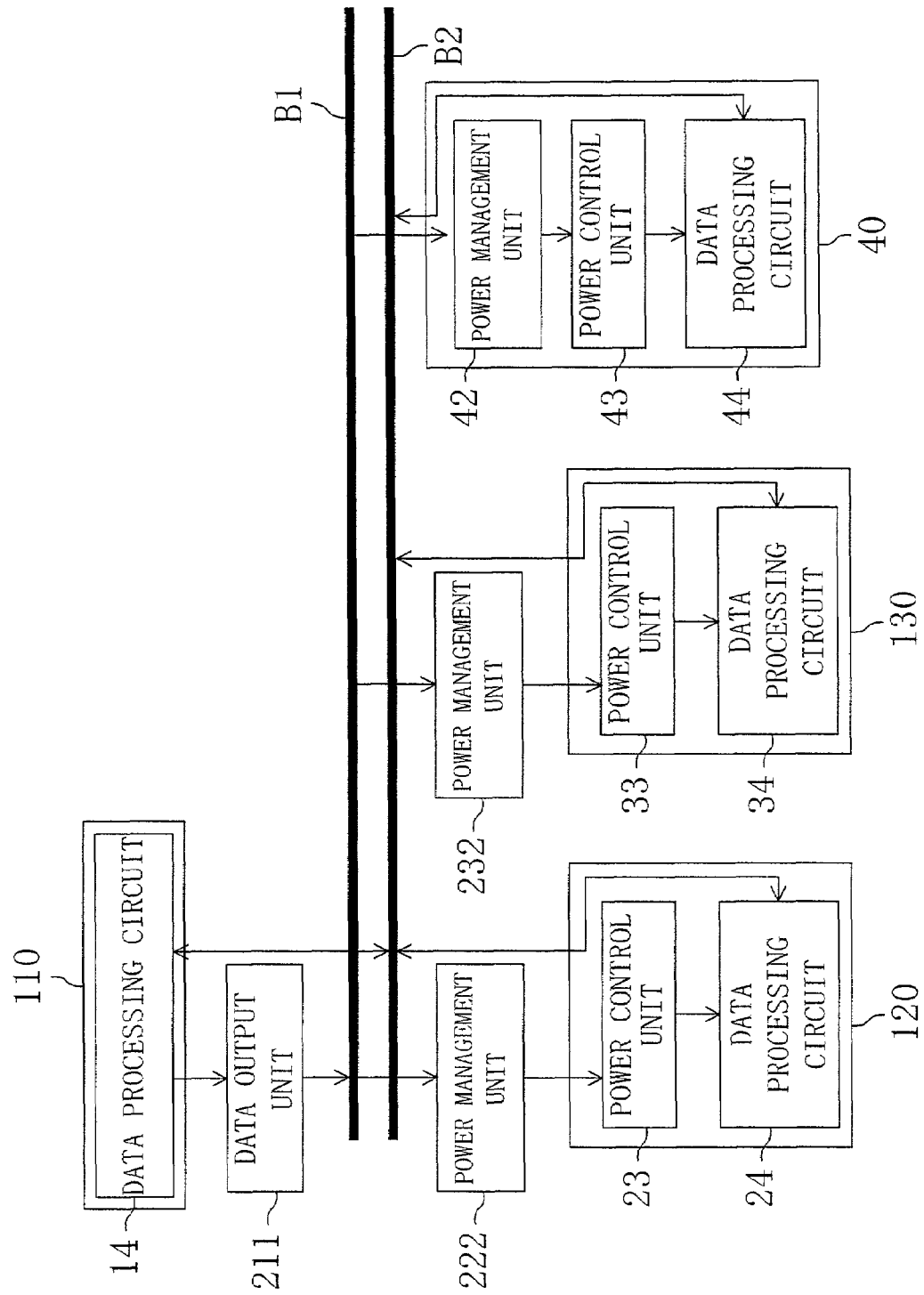
FIG. 8 is a block diagram of a power management system for an integrated circuit according to a second embodiment of the present invention.

FIG. 8 is a block diagram of a power management system for an integrated circuit according to a second embodiment of the present invention. The power management system of FIG. 8 is different from the power management system of FIG. 1 in that an independent data output unit 211 is provided in place of the data output unit 11 belonging to the block 10 and independent power management units 222 and 232 are provided in place of the power management units 22 and 32 belonging to the respective blocks 20 and 30. A block 110 corresponds to the portion of the block 10 other than the data output unit 11. A block 120 corresponds to the portion of the block 20 other than the power management unit 22. A block 130 corresponds to the portion of the block 30 other than the power management unit 32. As for the other components, they are the same as described in the first embodiment so that the description thereof is omitted by retaining the same reference numerals.

In the present embodiment, the block 110 and the data output unit 211 operate as a management data generating unit, while the block 120 and the power management unit 222 operate as a management data using unit. The block 130 and the power management unit 232 operate as another management data using unit. The block 40 operates as still another management data using unit.

A description will be given to the operation of the power management system of FIG. 8. The data output unit 211 determines the system state based on data outputted from the data processing circuit 14 and outputs power management data in accordance with the system state. The power management units 222 and 232 periodically read the power management data on the bus B1 and outputs control signals to the respective power control units 23 and 33. These control signals are for controlling respective power consumptions in the blocks 120 and 130. In short, the power management units 222 and 232 perform power management of the respective blocks 120 and 130.

Figure 9:
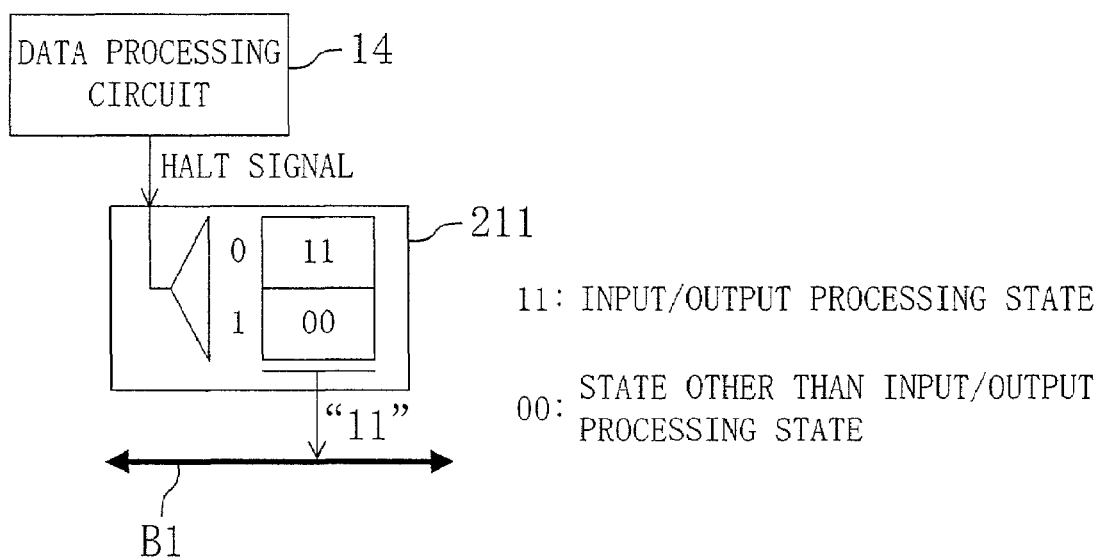
FIG. 9 is a block diagram showing an example of the data output unit of FIG. 8.

FIG. 9 is a block diagram showing an example of the data output unit 211 of FIG. 8. In FIG. 9, it is assumed that the data processing circuit 14 is specifically an input/output processing circuit and that the data output unit 211 has a memory.

The input/output processing circuit shifts a HALT signal as an output to "0" when input/output processing is performed and to "1" when the input/output processing is not performed. The data output unit 211 stores a value "11" at an address 0 and stores a value "00" at an address 1. The data output unit 211 receives the HALT signal, uses it as an address in the memory, and outputs the value "11" indicative of an input/output processing state when the HALT signal is "0", while outputting the value "00" indicative of a state other than the input/output processing state when the HALT signal is "1".

In the input/output processing state, e.g., the data processing circuit 24 and the like other than the input/output processing circuit and irrelevant to input/output operations need not operate so that the power management units 222, 232, and 42 output such signals as to reduce power consumption by, e.g., halting the clock supply to each of the blocks 120, 130, and 140.

Thus, unlike the power management system according to the first embodiment, the power management system according to the present embodiment comprises the data output units and the power management units which are independent of the blocks. If a block that has been already designed is added to an integrated circuit system, therefore, the block need not be re-designed. It is sufficient to re-design only the data output units and the power management units. This allows easy construction of the power management system.

Embodiment 3

FIG. 10 is a block diagram of a power management system for an integrated circuit according to a third embodiment of the present invention. The power management system of FIG. 10 is different from the power management system of FIG. 8 in that a data output unit 251 is further provided. In place of the block 40, a block 150 and a power management unit 252 are provided. The block 150 comprises a power control unit 153 and a data processing circuit 154. As for the other components, they are the same as described in the second embodiment so that the description thereof is omitted by retaining the same reference numerals.

In the present embodiment, the block 110 and the data output units 211 operate as one management data generating unit, while the block 150 and the data output unit 251 operate as another management data generating unit. On the other hand, the block 120 and the power management unit 222 operate as one management data using unit, while the block 130 and the power management unit 232 operate as another management data using unit. The block 150 and the power management unit 252 operate as still another management data using unit.

The data output unit 251 is so configured as to output power management data based on the state of the data processing circuit 154 to the bus B1. The power management system of FIG. 10 is characterized in that it comprises the data output units 211 and 251 and either one of the data output units 211 and 251 is so configured as to output the power management data to the bus B1.

A description will be given to the operation of the power management system of FIG. 10. It is assumed that the operation of the data output unit 251 is initially at a halt. The data output unit 211 determines the system state based on the data outputted from the data processing circuit 14 and outputs power management data in accordance with the system state to the bus B1. The power management units 222, 232, and 252 periodically read the power management data on the bus B1 and output respective control signals to the power control units 23, 33, and 153. These control signals are for controlling respective power consumptions in the blocks 120, 130, and 150. In short, the power management units 222, 232, and 252 perform power management of the respective blocks 120, 130, and 150.

It is assumed that, at a certain time point, the data output unit 211 outputs data indicating that the block 110 relinquishes the right to operate as the master (master right). At this time, the data output unit 211 has its operation halted. The data processing circuit 154 of the block 150 directs the data output unit 251 to initiate its operation upon receipt of a notification that the block 110 has relinquished the master right. Thereafter, the block 150 operates as the master. The data output unit 251 determines the system state based on the data outputted from the data processing circuit 154 and outputs power management data in accordance with the system state to the bus B1. Based on the power management data, power management is performed in each of the blocks.

Likewise, it is assumed that the data output unit 251 outputs data indicating that the block 150 relinquishes the master right to the bus B1. At this time, the data output unit 251 has its operation halted. The data processing circuit 14 in the block 110 directs the data output unit 211 to initiate its operation upon recognizing that the block 150 has relinquished the master right from the data on the bus B1. Thereafter, the block 110 operates as the master.

Thus, the power management system according to the present embodiment realizes power management performed by a plurality of masters. In addition, the block 150 can operate as either a master or a slave.

It is to be noted that the number of blocks that can serve as masters may be three or more. The data indicative of the relinquishment of the master right may also be outputted to the bus B2. The data output unit 251 or the power management unit 252 may also be contained in the block 150.

Embodiment 4

Figure 11:
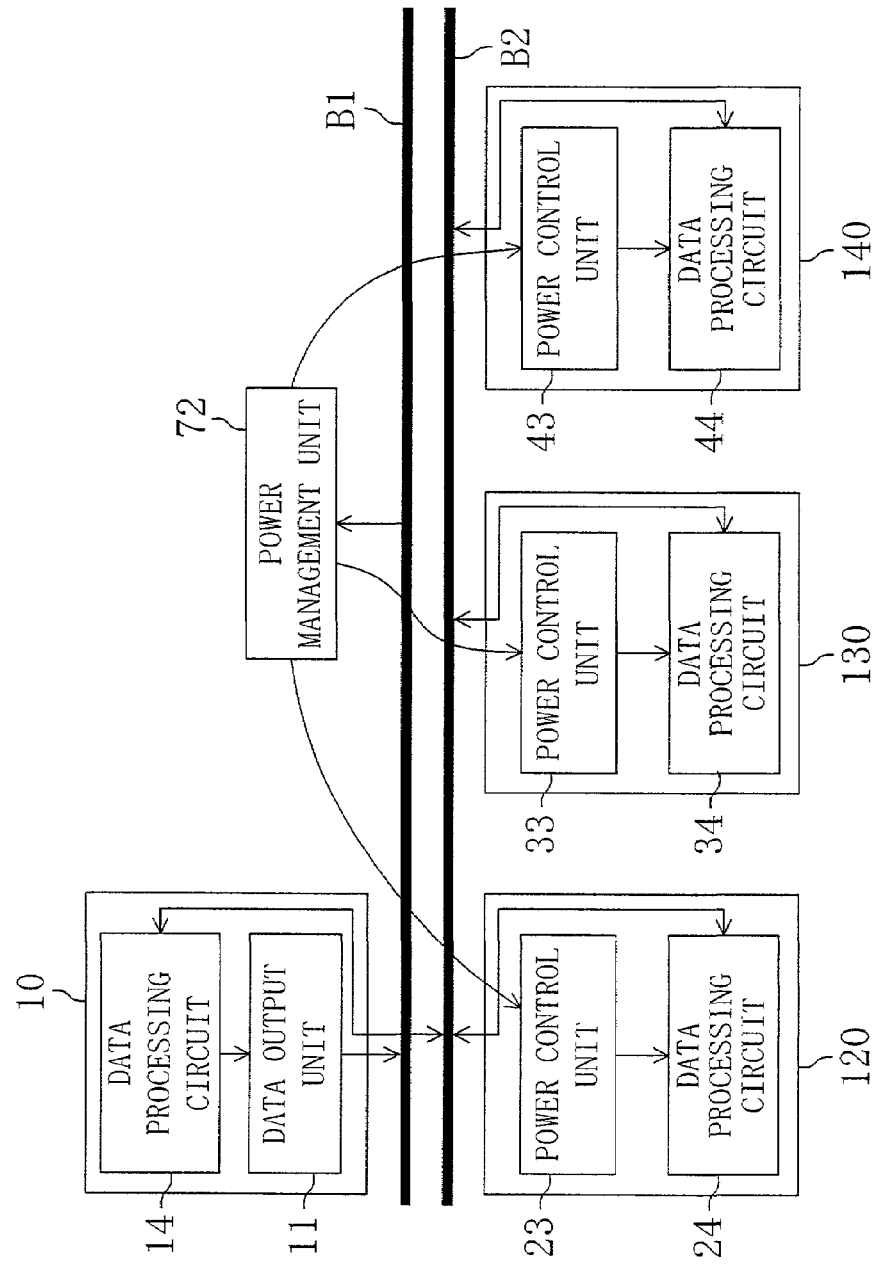
FIG. 11 is a block diagram of a power management system for an integrated circuit according to a fourth embodiment of the present invention.

FIG. 11 is a block diagram of a power management system for an integrated circuit according to a fourth embodiment of the present invention. The power management system of FIG. 11 is different from the power management system of FIG. 1 in that a power management unit 72 is provided in place of the power management units 22, 32, and 42. As for the other components, they are the same as described in the first embodiment so that the description thereof is omitted by retaining the same reference numerals.

In the present embodiment, the block 10 operates as a management data generating unit, while the block 120 and the power management unit 72 operate as a management data using unit. The block 130 and the power management unit 72 operate as another management data using unit, while the block 140 and the power management unit 72 operate as still another management data using unit.

The data output unit 11 determines the system state based on data outputted from the data processing circuit 14 and outputs power management data in accordance with the system state. The power management unit 72 periodically reads the power management data on the bus B1 and outputs signals for controlling respective power consumptions in the blocks 120, 130, and 140 to the power control units 23, 33, and 43. In short, the power management unit 72 performs power management of the blocks 120, 130, and 140.

Since one power management unit thus performs power management of a plurality of blocks, a smaller amount of hardware is used sufficiently than in the case where a power management unit is provided on a per slave-block basis. In the case of adding a slave block, the data output unit need not be changed and the amount of hardware is barely increased.

Embodiment 5

Figure 12:
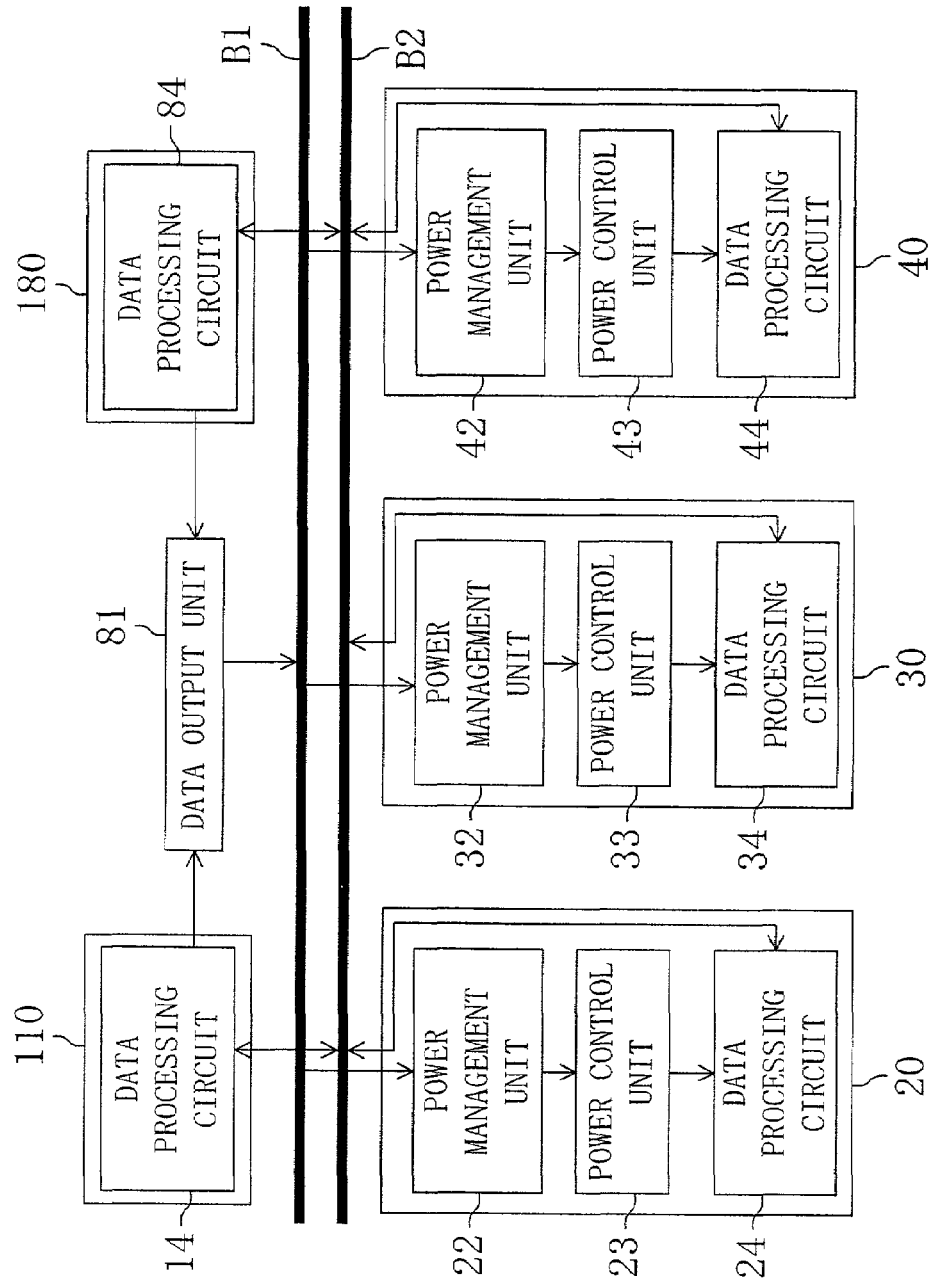
FIG. 12 is a block diagram of a power management system for an integrated circuit according to a fifth embodiment of the present invention.

FIG. 12 is a block diagram of a power management system for an integrated circuit according to a fifth embodiment of the present invention. The power management system of FIG. 12 is different from the power management system of FIG. 1 in that the block 110 and a block 180 are provided in place of the block 10 and a data output unit 81 is further provided. The blocks 110 and 180 comprise respective data processing circuits 14 and 84. As for the other components, they are the same as described in the first embodiment so that the description thereof is omitted by retaining the same reference numerals.

In the present embodiment, the blocks 110 and 180 and the data output unit 81 operate as a management data generating unit, while each of the blocks 20, 30, and 40 operates as one management data using unit.

Each of the data processing circuits 14 and 84 outputs data indicative of the internal state thereof to the data output unit 81. The data output unit 81 determines the system state based on data outputted from the data processing circuits 14 and 84 and outputs power management data in accordance with the system state to the bus B1. As for the subsequent operations, they are the same as in the first embodiment so that the description thereof is omitted.

Since the system state is thus determined by one data output unit based on the respective states of a plurality of master blocks, a smaller amount of hardware is used sufficiently compared with the case where a data output unit is provided for each of blocks that can serve as masters. In the case of adding a block that can serve as a master, the amount of hardware for power management is barely increased.

In each of the second to fifth embodiments also, it is possible for the data output unit 211 or the like to generate data which allows direct control of each of the power control units and output the data as power management data to the bus B1, similarly to the first embodiment.

Thus, the present invention allows power management to shift from conventional centralized management using a master to distributed management using a slave. Since the slave block and the master block can be designed independently of each other with no interdependence, a power management system for an integrated circuit can be constructed easily.

What is claimed is:

1. A power management system for an integrated circuit, the system comprising:
   a signal line;
   a management data generating unit connected to the signal line; and
   a plurality of management data using units each connected to the signal line,
   wherein the management data generating unit outputs, to the signal line, power management data indicative of a state of at least a part of the power management system,
   wherein each of the management data using units reads the power management data for common use from the signal line and controls power consumed by the management data using unit itself utilizing the power management data,
   wherein each of the management data using units includes:
   a slave block operating as a slave; and
   a power management unit corresponding to the slave block, the power management unit reading the power management data from the signal line, generating a control signal for performing power control over the corresponding slave block based on the power management data, and outputting the control signal,
   wherein the slave block controls power consumed by the slave block in accordance with the control signal outputted from the corresponding power management unit,
   wherein each of the power management units generates the control signal based on the power management data for common use.

2. The power management system of claim 1, wherein the management data generating unit is a master block operating as a master, the master block including:
   a data processing circuit for performing data processing; and a data output unit for outputting the power management data to the signal fine based on a state of the data processing circuit.

3. The power management system of claim 2, wherein the data processing circuit includes:
   a boundary scan register for storing data inputted to and outputted from the data processing circuit and outputting the data to the data output unit; and
   a register control unit for controlling an operation of the boundary scan register,
   wherein the data output unit effects specified control over the register control unit to direct the boundary scan register to store and output the data and determines the state of the data processing circuit based on the data outputted from the boundary scan register.

4. The power management system of claim 1, wherein the management data generating unit includes:
   a master block operating as a master; and
   a data output unit corresponding to the master block, the data output unit outputting the power management data to the signal line based on a state of the corresponding master block.

5. The power management system of claim 4, wherein the management data generating unit includes a plurality of master blocks, at least two of the plurality of master blocks corresponding in common to one of the data output units.

6. The power management system of claim 1, wherein at least two of the slave blocks correspond in common to one of the power management units.

7. The power management system of claim 1, wherein the power management unit comprises a buffer, the buffer regenerating a signal representing the power management data and outputting the regenerated signal.

8. The power management system of claim 1, wherein the power management unit comprises a flip-flop, the flip-flop latching the power management data and outputting the latched power management data.

9. The power management system of claim 1, wherein the power management unit comprises a data conversion unit for converting the power management data to the control signal.

10. The power management system of claim 9, wherein the data conversion unit is a memory.

11. The power management system of claim 9, wherein the data conversion unit is composed of a logic circuit.

12. The power management system of claim 11, wherein the logic circuit is a programmable device.

13. The power management system of claim 1, further comprising:
   a data transmission unit between the signal line and the management data using unit, the data transmission unit reading the power management data from the signal line, selecting data to be transmitted to the management data using unit, and outputting the selected data.

14. The power management system of claim 1, wherein the management data using units are grouped,
   the management data generating unit outputs group specifying data in conjunction with the power management data to the signal line, and
   each of the management data using units belonging to a group specified by the group specifying data controls power consumed by the management data using unit.

15. The power management system of claim 1 further comprising, in addition to the management data generating unit, at least one management data generating unit, one of the management data generating units outputting, to the signal line, the power management data corresponding to a state of the management data generating unit.

* * * * *